(12) United States Patent
Jang et al.

(10) Patent No.: US 10,176,938 B2
(45) Date of Patent: Jan. 8, 2019

(54) DOUBLE DEAD BAND TAB SWITCH FOR TRANSFORMER AND CONTROL METHOD

(71) Applicant: KOREA UNIVERSITY RESEARCH AND BUSINESS FOUNDATION, Seoul (KR)

(72) Inventors: Gilsoo Jang, Seoul (KR); Chong Suk Song, Seoul (KR)

(73) Assignee: KOREA UNIVERSITY RESEARCH AND BUSINESS FOUNDATION, Seoul (KR)

(*) Notice: Subject to any disclaimer, the term of this patent is extended or adjusted under 35 U.S.C. 154(b) by 55 days.

(21) Appl. No.: 15/030,824

(22) PCT Filed: Aug. 1, 2014

(86) PCT No.: PCT/KR2014/007099
§ 371 (c)(1),
(2) Date: Apr. 20, 2016

(87) PCT Pub. No.: WO2015/060520
PCT Pub. Date: Apr. 30, 2015

(65) Prior Publication Data
US 2016/0254106 A1    Sep. 1, 2016

(30) Foreign Application Priority Data
Oct. 25, 2013  (KR) ................. 10-2013-0127763

(51) Int. Cl.
*H01H 9/00* (2006.01)
*H01F 29/04* (2006.01)
(Continued)

(52) U.S. Cl.
CPC ......... *H01H 9/0005* (2013.01); *H01F 29/04* (2013.01); *H02J 3/12* (2013.01); *H02J 3/38* (2013.01)

(58) Field of Classification Search
CPC .......... H01F 29/04; H01H 9/0005; H02J 3/12; H02J 3/38
See application file for complete search history.

(56) References Cited

U.S. PATENT DOCUMENTS

2010/0264897 A1* 10/2010 Larsson ............... G05F 1/14
                                                           323/304
2011/0074367 A1*  3/2011 Yoon .................. H02J 3/1842
                                                           323/210
(Continued)

FOREIGN PATENT DOCUMENTS

JP    2007-006674    1/2007
JP    3992212        8/2007
(Continued)

*Primary Examiner* — Adolf Berhane
*Assistant Examiner* — Bart Iliya
(74) *Attorney, Agent, or Firm* — Duane Morris LLP; J. Rodman Steele, Jr.; Gregory M. Lefkowitz

(57) ABSTRACT

The present invention relates to a tap switch control method, which comprises the steps of: measuring data of a distribution system; calculating a second dead band and a reference voltage using the measured data; comparing the difference between the measured actual voltage and the reference voltage with a first dead band; comparing the difference between the actual voltage and the reference voltage with the second dead band, when the difference between the actual voltage and the reference voltage is outside the first dead band as a result of the comparison with the first dead band; and controlling the tap of the transformer, when the difference between the actual voltage and the reference voltage is outside the second dead band as a result of the comparison with the second dead band. Accordingly, it is possible to suppress a frequent operation of tap switching due to the fluctuations of the system and distributed power supply by applying the double dead band and to ensure the transformer's lifespan.

9 Claims, 7 Drawing Sheets

(51) Int. Cl.
 *H02J 3/12* (2006.01)
 *H02J 3/38* (2006.01)

(56) References Cited

U.S. PATENT DOCUMENTS

| | | | | |
|---|---|---|---|---|
| 2013/0030599 A1* | 1/2013 | Milosevic | ................ | H02J 3/14 |
| | | | | 700/298 |
| 2015/0286227 A1* | 10/2015 | Watanabe | ............ | H02J 3/1878 |
| | | | | 323/340 |
| 2016/0041568 A1* | 2/2016 | Daley | ..................... | G05F 1/14 |
| | | | | 323/341 |
| 2016/0087566 A1* | 3/2016 | Sun | ........................ | H02J 3/00 |
| | | | | 700/287 |

FOREIGN PATENT DOCUMENTS

| | | |
|---|---|---|
| JP | 2011-55599 | 3/2011 |
| JP | 2011-229267 | 11/2011 |
| KR | 10-2008-0110582 | 12/2008 |

\* cited by examiner

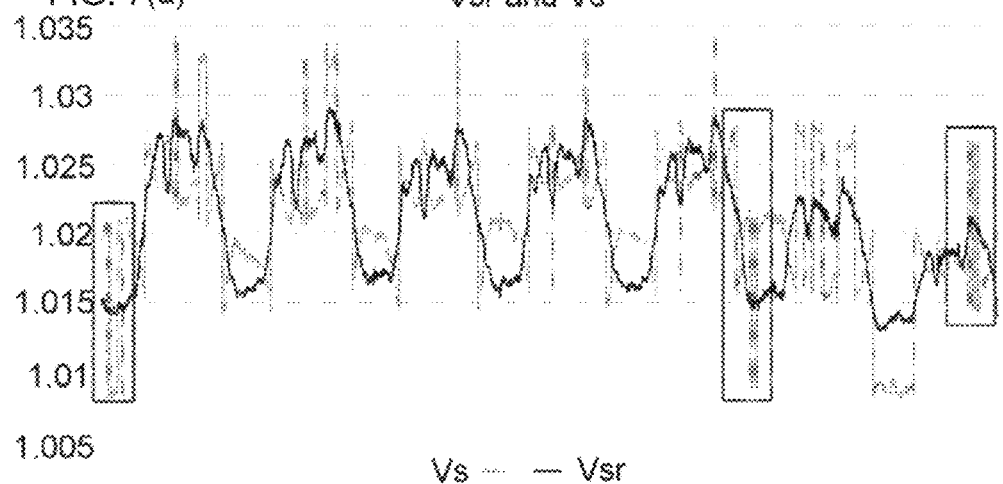
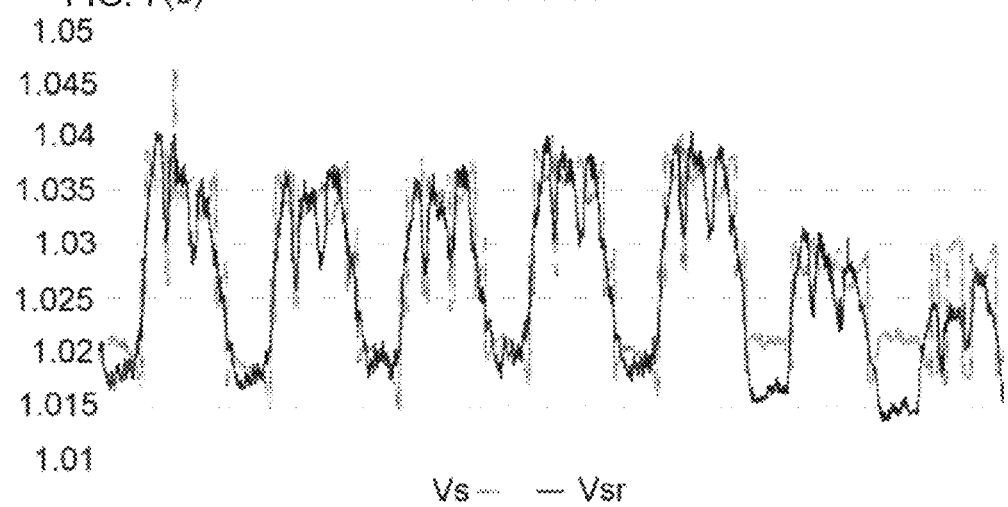

DOUBLE DEAD BAND TAB SWITCH FOR TRANSFORMER AND CONTROL METHOD

CROSS-REFERENCE TO RELATED APPLICATIONS

This application is a § 371 national stage entry of International Application No. PCT/KR2014/007099, filed on Aug. 1, 2014, which claims priority to South Korean Patent Application No. 10-2013-0127763, filed on Oct. 25, 2013, the entire contents of which are incorporated herein by reference.

TECHNICAL FIELD

The present disclosure relates to a tap switch, and more particularly, to a tap switch for suppressing a frequent operation of tap switching clue to the fluctuations of the system and distributed power supply by applying a double dead band and for ensuring the transformer's life span.

BACKGROUND ART

Presently, as a distributed power source occupies a growing importance in a power system, many issues and problems to be solved occur due to its influence applied to the system, and their solutions are being actively studied. Among them, a problem occurring in system operations is greatly influenced by a voltage fluctuation of a distribution system at the present due to an output fluctuation of a distributed power source and causes frequent tap operations of a tap switching device which adjusts a voltage at a substation. The tap switching device is being designed and operated in accordance with an existing unidirectional system having no distributed power source and is operated suitable for a lifespan of 20 years, and thus such frequent tap operations give bad influences on the lifespan of the transformer. To solve this problem, an energy storage device or other compensation devices should be installed and operated for the output fluctuation of a distributed power source, but this requires a significant installation and operation cost and thus does not give a workable solution in aspect of economical point. Due to the above problem, at the present, a system operator often operates the tap of a tap switch in a fixed state. However, since a voltage should be adjusted depending on a system situation, this method is inappropriate for actual operations. Therefore, there is needed a new scheme capable of fundamentally solving the corresponding problem.

As a related art of the present disclosure, there is Korean unexamined patent publication No. 10-2008-0110582, entitled "universal input device for a tap switch".

DISCLOSURE

Technical Problem

The present disclosure is directed to providing a tap switch control method using a double dead band.

The present disclosure is also directed to providing a tap switch using a double dead band.

Technical Solution

In one general aspect, the present disclosure provides a tap switch control method, comprising: measuring data of a distribution system; calculating a second dead band and a reference voltage using the measured data; comparing the difference between the measured actual voltage and the reference voltage with a first dead band; comparing the difference between the actual voltage and the reference voltage with the second dead band, when the difference between the actual voltage and the reference voltage is outside the first dead band as a result of the comparison with the first dead band; and controlling the tap of the transformer, when the difference between the actual voltage and the reference voltage is outside the second dead band as a result of the comparison with the second dead band.

In an embodiment of the present disclosure, in the measuring of data of a distribution system, at least one of a current of each feeder, a secondary bus voltage, a tap state, and a capacity of a distributed power source may be measured.

In an embodiment of the present disclosure, in the calculating of a second dead band and a reference voltage, a distributed power source voltage difference of each feeder, which is a difference between a voltage when a distributed power source of each feeder is excluded and a voltage when a total capacity of the distributed power source is applied, may be calculated, and a half of a greatest value among the calculated distributed power source voltage difference of each feeder may be calculated as the second dead band.

In an embodiment of the present disclosure, in the calculating of a second dead band and a reference voltage, a greatest value among voltages calculated using a feeder current and a feeder compensation impedance of each feeder may be calculated as the reference voltage.

In an embodiment of the present disclosure, the tap switch control method may further include: determining whether the time during which the difference between the actual voltage and the reference voltage is outside the second dead band is equal to or greater than a reference time, wherein the tap may be controlled only when the time during which the difference between the actual voltage and the reference voltage is outside the second dead band is equal to or greater than the reference time.

In another general aspect, the present disclosure provides a tap switch, comprising: a measurement unit configured to measure data of a distribution system; a determination unit configured to calculate a second dead band and a reference voltage using the measured data, and compare the difference between the measured actual voltage and the reference voltage with a first dead band and the second dead band doubly to determine whether the difference between the actual voltage and the reference voltage is out of a dead band; and a tap control unit configured to control the tap of the transformer, when the difference between the actual voltage and the reference voltage is outside the dead band.

Advantageous Effects

According to the present disclosure, a frequent operation of a tap may be suppressed, and the lifespan of a tap switch may be ensured. In addition, a problem occurring in controlling tap switching may be fundamentally solved, and there is substantially no additional cost, which may ensure significant workable and ripple effects. Further, since a double dead band may be easily applied to an existing tap switching method, there is little or no cost burden for additional control, and an existing tap switching method may be applied to any transformer which is already installed or newly installed or designed.

DESCRIPTION OF DRAWINGS

FIG. 6 b is a diagram tap switching method according to an embodiment of the present disclosure.

FIG. 7(a) is a graph showing the change of Vs and Vsr values using an existing LDC method.

FIG. 7(b) is a graph showing the change of Vs and Vsr values when the method according to an embodiment of the present disclosure is applied.

BEST MODE

Figure 1:
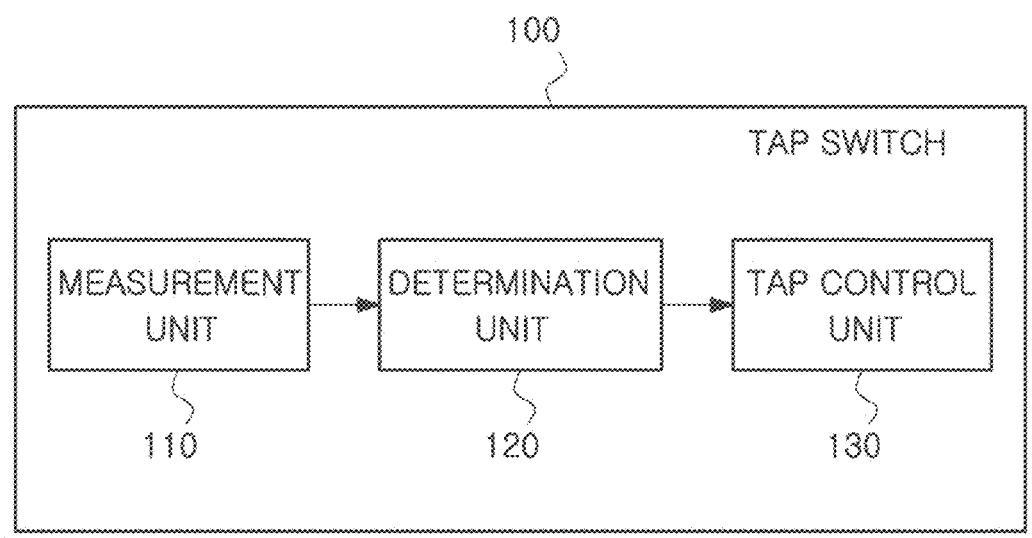
FIG. 1 is a block diagram shoving a tap switch according to an embodiment of the present disclosure.

A tap switch control method according to an embodiment of the present disclosure includes: measuring data of a distribution system; calculating a second dead band and a reference voltage using the measured data; comparing the difference between the measured actual voltage and the reference voltage with a first dead band; comparing the difference between the actual voltage and the reference voltage with the second dead band, when the difference between the actual voltage and the reference voltage is outside the first dead band as a result of the comparison with the first dead band; and controlling the tap of the transformer, when the difference between the actual voltage and the reference voltage is outside the second dead band as a result of the comparison with the second dead band.

MODE FOR INVENTION

Prior to the explanation of the present disclosure, solutions or technical spirit of the present disclosure will be summarized or essentially proposed for convenient understanding.

A tap switch control method according to an embodiment of the present disclosure includes: measuring data of a distribution system; calculating a second dead band and a reference voltage using the measured data; comparing the difference between the measured actual voltage and the reference voltage with a first dead band; comparing the difference between the actual voltage and the reference voltage with the second dead band, when the difference between the actual voltage and the reference voltage is outside the first dead band as a result of the comparison with the first dead band; and controlling the tap of the transformer, when the difference between the actual voltage and the reference voltage is outside the second dead band as a result of the comparison with the second dead band.

Hereinafter, embodiments of the present disclosure, which can be easily implemented by those skilled in the art, are described in detail with reference to the accompanying drawings. However, these embodiments are just for better understanding of the present disclosure and it will be obvious to those skilled in the art that the scope of the present disclosure is not limited to these embodiments.

The configuration of the present disclosure will be described in detail with reference to the accompanying drawings based on the embodiments of the present disclosure to clearly understand the solutions of the present disclosure. Here, when endowing reference numerals to components depicted in the drawings, the same reference numeral is given to the same component even though this component is depicted in different drawings, and when any drawing is explained, a component depicted in another drawing may also he cited, if necessary. Moreover, when explaining an operation principle of an embodiment of the present disclosure, detailed explanation of any known function or configuration related to the present disclosure or other matters may be omitted if it may unnecessarily make the essence of the present disclosure confused.

FIG. 1 is a block diagram showing a tap switch according to an embodiment of the present disclosure.

A tap switch 100 according to an embodiment of the present disclosure includes a measurement unit 110, a determination unit 120, and a tap control unit 130.

The measurement unit 110 measures data of a distribution system.

In more detail, in order to determine whether or not to adjust a tap of a transformer, data of a distribution system including the transformer is measured. The measurement unit 110 may measure a current of each feeder, a secondary bus voltage, a tap state, and a capacity of a distributed power source. The capacity of a distributed power source may be a total capacity of a distributed power source of each feeder, managed by means of a database of a distribution service provider or operator, and this may be automatically received from the database or input by the distribution service provider or operator. In addition, data required for adjusting the tap may be measured.

The determination unit 120 calculates a second dead band and a reference voltage by using the measured data, and compares a difference between a measured actual voltage and the reference voltage doubly by using a first dead band and the second dead band to determine whether the difference between the actual voltage and the reference voltage is outside a dead band.

In more detail, when adjusting the tap, in order to reduce unnecessary tap operations by applying a dead band doubly, the determination unit 120 determines whether the difference between the actual voltage and the reference voltage is outside the dead band, by using the first dead band and the second dead band. The first dead band may be a preset dead band, or a dead band used in an existing tap switch. The second dead band is a dead band which vanes depending on a situation of each feeder, calculated by using a current of the feeder, measured by the measurement unit 110, and the distributed power source, and the second dead band is used for determining whether a tap operation is actually required. In addition, the reference voltage is also a voltage which varies depending on a situation of each feeder, similar to the current of the feeder, and the reference voltage is calculated in real time.

The determination unit 120 calculates a distributed power source voltage difference of each feeder, which is a difference between a voltage when a distributed power source of each feeder is excluded and a voltage when a total capacity of the distributed power source is applied, calculates a half of a greatest value among the calculated distributed power source voltage difference of each feeder as the second dead band, and calculates a greatest value among voltages calculated using a feeder current and a feeder compensation impedance of each feeder as the reference voltage. The second dead band and reference voltage varies depending on a situation of each feeder, and thus in order to determine whether the actual voltage is outside the dead band by using the second dead band and the reference voltage, the determination unit 120 calculates the second dead band and the reference voltage in real time or periodically. In order to calculate the second dead band, a distributed power source voltage difference of each feeder, which is a difference between a voltage when a distributed power source of each feeder is excluded and a voltage when a total capacity of the distributed power source is applied, is calculated. A half of a greatest value of the calculated distributed power source voltage difference of each feeder is calculated as the second dead band. This may be expressed like Equation 1 below.

$$DB_D = 0.5 * \max(\Delta V_i) = V_{noDG,i} - V_{DG,i} \text{ for } i=1, \ldots, n \quad \text{[Equation 1]}$$

Here, $DB_D$ is a second dead band, $\Delta V_i$ is a difference of a distributed power source voltage at an i feeder, $V_{noDG,i}$ is a voltage when a distributed power source is excluded, and $V_{DG,i}$ is a voltage when a total capacity of the distributed power source is applied. The $V_{noDG,i}$ may be calculated by Equation 2 below.

$$V_{noDG,i} = V_{cen} + Z_{comp,i} I_{i,max} \quad \text{[Equation 2]}$$

Here, $V_{cen}$ is a load center voltage, $Z_{comp,i}$ is a calculated feeder compensation impedance, and $I_{i,max}$ is a current at a maximum load condition. The $I_{i,max}$ may be $I_{0.9,i}(t)$ to which a power factor is applied.

The $V_{DG,i}$ may be calculated by Equation 3 below.

$$V_{DG,i} = V_{cen} + Z_{comp,i} I_{net,i}(t) \quad \text{[Equation 3]}$$

Here, $I_{net,i}(t)$ is a current to which a total capacity of the distributed power source is applied. $I_{net,i}(t)$ may be calculated by Equation 4 below.

$$I_{net,i}(t) = I_i(t) - I_{DG,i}(t) \quad \text{[Equation 4]}$$

The reference voltage for calculating a difference between the measured actual voltage and the reference voltage is calculated as a greatest value among voltages calculated using a feeder current and a feeder compensation impedance of each feeder. The reference voltage may be calculated by Equation 5 below.

$$\max V_{sr,i}(t) = V_{cen} + Z_{comp,i} I_i(t) \quad \text{[Equation 5]}$$

As described above, by using the second dead band and the reference voltage calculated as above as well as first dead band, it is determined whether the measured actual voltage is outside the dead band.

First, the difference between the measured actual voltage and the calculated reference voltage is compared with the first dead band. The measured actual voltage is a voltage measured at a secondary end of the transformer. If the difference between the actual voltage and the reference voltage is not outside the first dead band as a result of the comparison with the first dead band, it is determined that the tap is not operated. If the difference between the actual voltage and the reference voltage is outside the first dead band as a result of the comparison with the first dead band, the tap is not instantly operated, but the difference is compared with the second dead band doubly, thereby determining whether or not to operate the tap. For this, the difference between the actual voltage and the reference voltage is compared with the second dead band. If the difference between the actual voltage and the reference voltage is outside the second dead band as a result of the comparison with the second dead band, it is determined that the tap needs to be operated. If the difference between the actual voltage and the reference voltage is not outside the second dead band, it is determined that the tap is not operated. The comparison for determining whether or not to operate the tap may be expressed as Equation 6 below.

$$e(t) = \begin{cases} 1, & \text{if } \Delta V > DB/2, \Delta V - DB/2 > DB_D/2 \\ -1, & \text{if } \Delta V < -DB/2, \Delta V + DB/2 < -DB_D/2 \\ 0, & \text{otherwise} \end{cases} \quad \text{[Equation 6]}$$

In other words, if the difference between the measured actual voltage and the calculated reference voltage is outside a double dead band formed with the first dead band and the second dead band and also the actual voltage is greater than the reference voltage, it is determined that the tap needs to be increased, and if the difference between the measured actual voltage and the calculated reference voltage is outside the double dead band formed with the first dead band and the second dead band and also the actual voltage is smaller than the reference voltage, it is determined that the tap needs to be decreased. However, if the difference between the measured actual voltage and the calculated reference voltage is not outside the double dead band, it is determined fiat the tap is not operated.

The difference between the measured actual voltage and the calculated reference voltage may be expressed as Equation 7 below.

$$\Delta V = V_s(t) - V_{sr}(t) \quad \text{[Equation 7]}$$

Here, $V_s(t)$ is a voltage measured at a secondary side of the transformer and theoretically may be expressed like Equation 8 below.

$$V_s(t) = V_{tap}(t) - Z_{MTR} * I(t) \quad \text{[Equation 8]}$$

Here, $V_{tap}(t)$ is a secondary voltage generated by a transformer connection, and $Z_{MTR}$ is transformer impedance.

After determining that the difference between the measured actual voltage and the calculated reference voltage is outside the double dead band, only when the time during which the difference is outside the second dead band is equal to or greater than a reference time, it may be determined to operate the tap. It may be unnecessary to operate the tap when the difference is temporarily outside the double dead band, and thus when the time during which the difference is outside the double dead band is equal to or greater than a predetermined time, it may be finally determined that the tap needs to be operated. This may be expressed as Equation 9 below.

$$\Delta n(t) = \begin{cases} 1, & \text{if } t > T_D, e(t) = 1 \\ -1, & \text{if } t > T_D, e(t) = -1 \\ 0, & \text{otherwise} \end{cases} \quad \text{[Equation 9]}$$

Here, $T_D$ is a time delay of the tap switch, and the tap may be operated only when the time exceeds the time delay.

The tap control unit 130 controls the tap of the transformer depending on whether the difference between the actual voltage and the reference voltage is outside the dead band.

In more detail, the tap may be controlled by increasing or decreasing the tap depending on whether the determination unit 120 determines to operate the tap.

Figure 2:
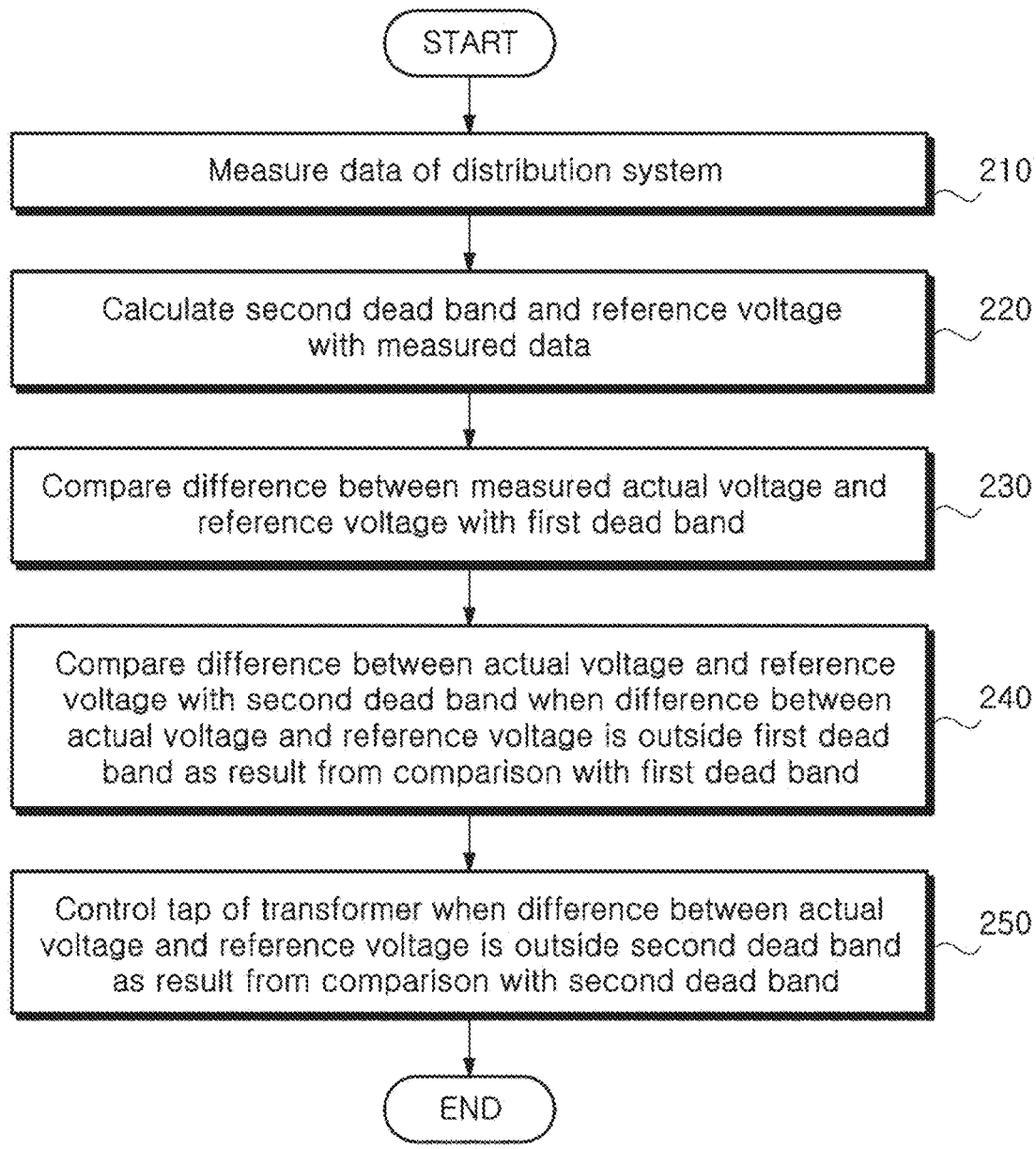
FIG. 2 is a flowchart for illustrating a tap switch control method according to an embodiment of the present disclosure.

FIG. 2 is a flowchart for illustrating a tap switch control method according to an embodiment of the present disclosure.

Step 210 is a step of measuring data of a distribution system.

In more detail, at least one of a current of each feeder, a secondary bus voltage, a tap state, and a capacity of a distributed power source is measured. The detailed description of this step corresponds to the explanation in relation to the measurement unit 110 of FIG. 1 and thus can be understood from the explanation in relation to the measurement unit 110 of FIG. 1.

Step 220 is a step of calculating a second dead band and a reference voltage by using the measured data.

In more detail, a second dead band and a reference voltage for determining whether or not to operate the tap by doubly applying a second dead band in addition to a preset first dead band are calculated. The second dead band and the reference voltage may vary depending on situation and characteristic of each feeder. For this, by using the date measured in Step 210, the second dead band and the reference voltage are calculated in real time or periodically. Regarding the second dead band, a distributed power source voltage difference of each feeder, which is a difference between a voltage when a total capacity of the distributed power source is applied and a voltage when a distributed power source of each feeder is excluded, is calculated, and a half of a greatest value among the calculated distributed power source voltage difference of each feeder may be calculated as the second dead band. Regarding the reference voltage, a greatest value among voltages calculated using a feeder current and a feeder compensation impedance of each feeder may be calculated as the reference voltage. The detailed description of this step corresponds to the explanation in relation to the determination unit 120 of FIG. 1 and thus can be understood from the explanation in relation to the determination unit 120 of FIG. 1.

Step 230 is a step of comparing the difference between the actual voltage and the reference voltage with the first dead band.

In more detail, the difference between the measured actual voltage and the reference voltage calculated in Step 220 is compared with the first dead band to determine whether the difference is outside the first dead band. The first dead band may be preset or may use an existing single dead band. The detailed description of this step corresponds to the explanation in relation to the determination unit 120 of FIG. 1 and thus can be understood from the explanation in relation to the determination unit 120 of FIG. 1.

Step 240 is a step of comparing the difference between the actual voltage and the reference voltage with the second dead band, when the difference between the actual voltage and the reference voltage is outside the first dead band as a result of the comparison with the first dead band.

In more detail, in order to reduce unnecessary tap operations of a single dead band, when the difference is outside the first dead band, the difference between the actual voltage and the reference voltage is doubly compared with the second dead band. By applying dead bands doubly, unnecessary tap operations may be reduced. The detailed description of this step corresponds to the explanation in relation to the determination unit 120 of FIG. 1 and thus can be understood from the explanation in relation to the determination unit 120 of FIG. 1.

Step 250 is a step of controlling the tap of the transformer, when the difference between the actual voltage and the reference voltage is outside the second dead band as a result of the comparison with the second dead band.

In more detail, if the difference between the actual voltage and the reference voltage is outside the first dead band and the second dead band, namely double dead bands, as a result of comparison of Step 240, the tap of the transformer needs to be operated, and thus the tap may he increased or decreased according to the result. The detailed description of this step corresponds to the explanation in relation to the tap control unit 130 of FIG. 1 and thus can be understood from the explanation in relation to the tap control unit 130 of FIG. 1.

A step of determining whether the time during which the difference between the actual voltage and the reference voltage is outside the second dead band is equal to or greater than a reference time may be further included.

In more detail, when the difference is temporarily outside the double dead band, in order to prevent a tap operation, it may be determined whether time during which the difference between the actual voltage and the reference voltage is outside the second dead band is equal to or greater than the reference time. The tap may be controlled only when the time during which the difference is outside the second dead band is equal to or greater than the reference time. The detailed description of this step corresponds to the explanation in relation to the determination unit 120 of FIG. 1 and thus can be understood from the explanation in relation to the determination unit 120 of FIG. 1.

Figure 3:
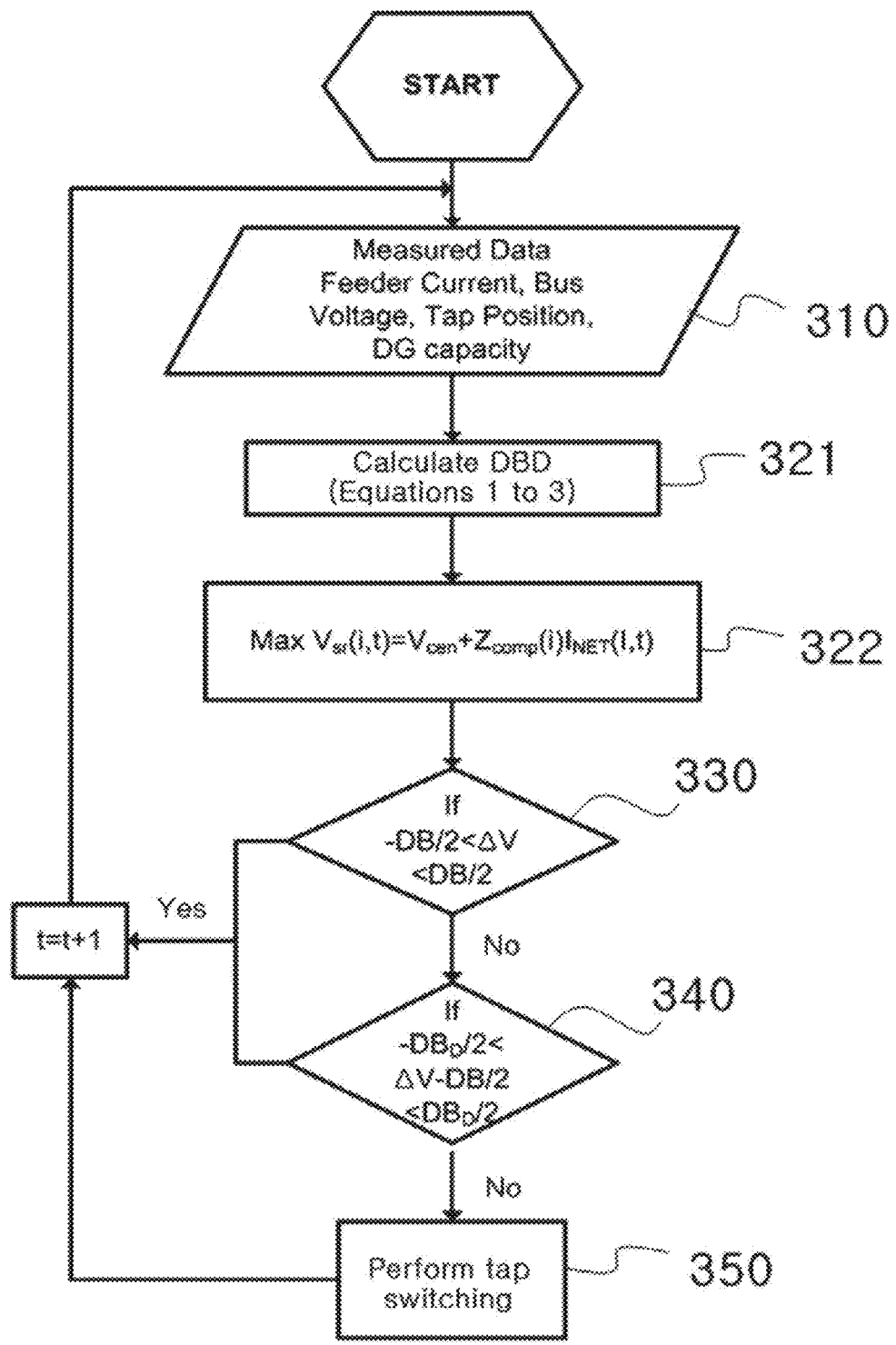
FIG. 3 is a flowchart for illustrating a tap switch control method according to an embodiment of the present disclosure.
Figure 4:
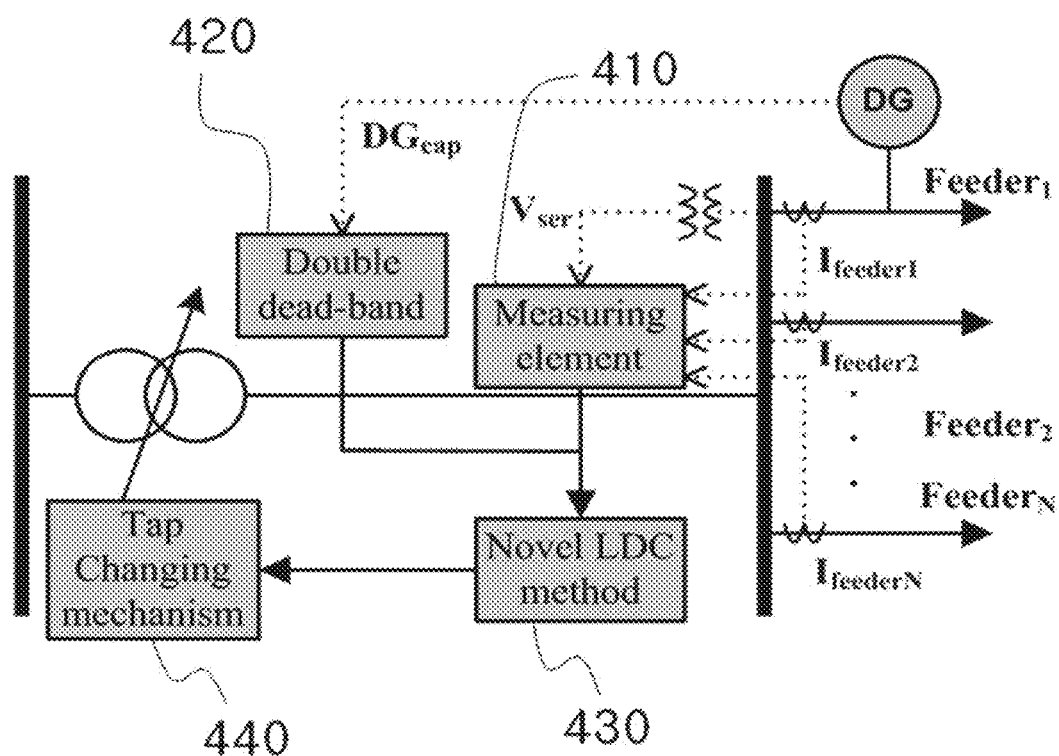
FIG. 4 is a diagram for illustrating a process of controlling a double dead band tap according to an embodiment of the present disclosure.

FIG. 3 is a flowchart for illustrating a tap switch control method according to an embodiment of the present disclosure, and FIG. 4 is a diagram for illustrating a process of controlling a double dead band tap according to an embodiment of the present disclosure.

In Step 310, data of a distribution system is measured. In Step 321, a double dead band, a second dead band is calculated. In Step 322, a reference voltage is calculated. By using the calculated result, in Step 330, it is determined whether the difference between the actual voltage and the reference voltage is inside the first dead band. If the difference is inside the first dead band, a tap is not operated, and if the difference is outside the first dead band, in Step 340, it is determined whether the difference is inside the second dead band. If the difference is inside the second dead band, the tap is not operated, and if the difference is outside the second dead band, in Step 350, the tap is operated according to the result. Referring to FIG. 4, in Step 410 (Measuring element), data of feeders connected to the distribution system are measured. In Step 420 (Double dead band), a second dead band is calculated. In Step 430 (Novel LDC method), it is determined whether a voltage is outside the double dead band. According to the result, in Step 440 (Tap Changing mechanism), tap switching is performed.

Figure 5:
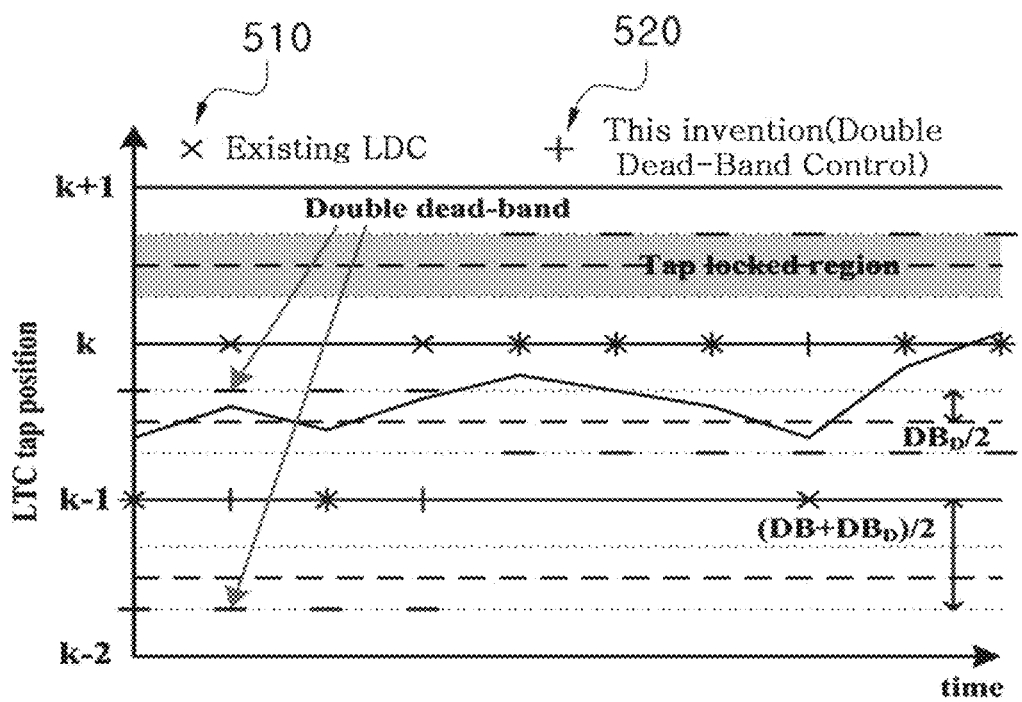
FIG. 5 is a diagram comparatively showing a tap switch control method according to an embodiment of the present disclosure and an existing method.
Figure 6A:
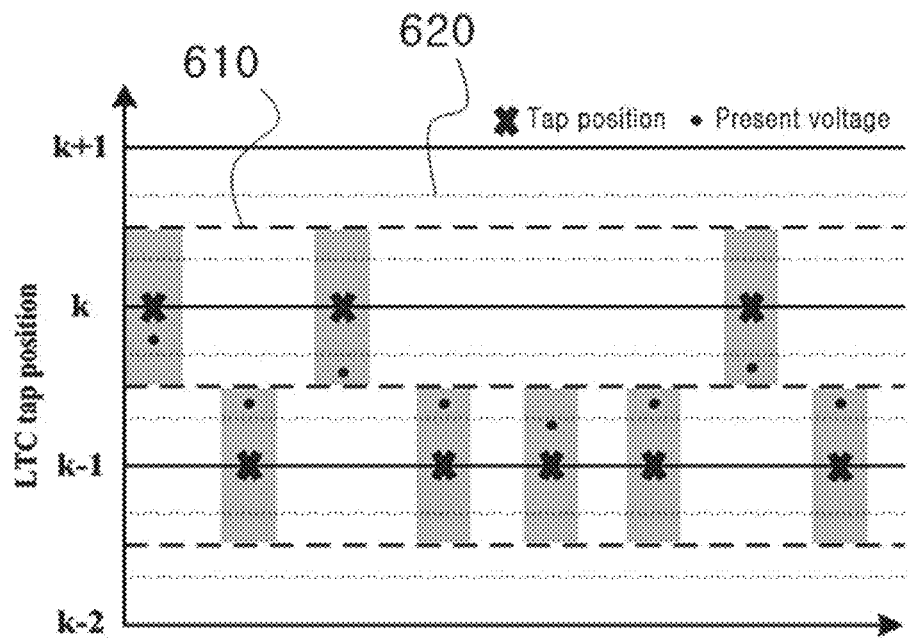
FIG. 6 a is a diagram tap switching method according to LDC.

FIGS. 5 and 6 are diagrams comparatively showing a tap switch control method according to an embodiment of the present disclosure and an existing method.

Figure 6B:
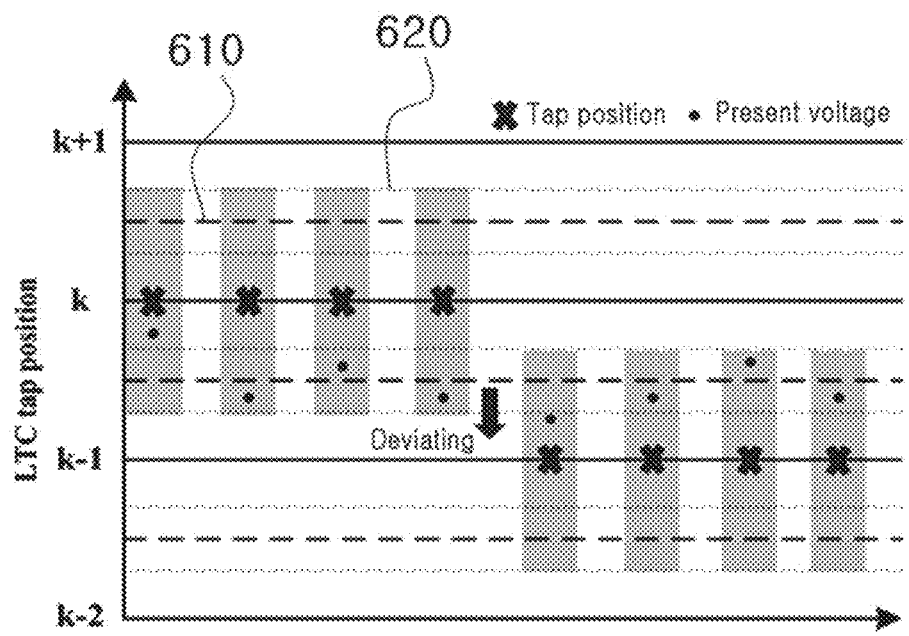

In case of an existing tap switching method (LDC, line drop compensation), in regard to a voltage moving outside a specific dead band, a tap changes its position to a next tap at instant of moving outside the specific dead band. However, the voltage varies according to load fluctuations or distributed power source fluctuations, and if the voltage fluctuation is formed around a dead band border line, a tap operation is generated whenever the voltage fluctuation passes by the dead band border line. According to an embodiment of the present disclosure, in order to prevent such frequent tap operations, another dead band (double dead band) may be applied to a dead band border line to suppress tap switching caused by voltage fluctuations generated around the dead band border line (a thick dotted line represents a dead band border line, and a thin dotted line represents a double dead band border line). FIG. 6(*a*) shows a tap switching method according to LDC, in which when a voltage is outside the dead band, the tap is operated instantly. However, in the tap switching method according to an embodiment of the present disclosure, as shown in FIG. 6(b), double dead bands are given to prevent unnecessary tap operations. In other words, by overriding unnecessary tap operations by means of the double dead bands, it is possible to ensure a voltage adjustment role of the tap switch while minimizing tap operations, and also it is possible to ensure a life span of the tap switch by minimizing tap operations.

Under the condition having system parameters as shown in Table 1 below, operation results of existing methods and the tap switch control method according to an embodiment of the present disclosure are shown in Table 2 below.

TABLE 1

|  | feeder 1 | feeder 2 | feeder 3 | feeder 4 |
|---|---|---|---|---|
| Max/min load (MVA) | 10/5 | 8/4 | 10/3.5 | 8/3.65 |
| Number of total buses | 50 | 20 | 30 | 30 |
| Feeder length (km) | 20 (0.0347 + j0.0746 [p.u./km] | 20 (0.0347 + j0.0746 [p.u./km] | 30 (0.0347 + j0.0746 [p.u./km] | 20 (0.0347 + j0.0746 [p.u./km] |
| Node gap (km) | 0.4 | 1 | 1 | 0.4-0.8 |
| Load per bus (MVA) | 0.2 (peak, 0.9 lagging) | 0.4 (peak, 0.9 lagging) | 0.25~0.5 (peak, 0.9 lagging) | 0.25~0.5 (peak, 0.9 lagging) |

TABLE 2

|  |  |  |  | Operation frequency | | | | | | |
|---|---|---|---|---|---|---|---|---|---|---|
|  | Scenario | Case | total | MON | TUE | WED | THU | FRI | SAT | SUN |
| existing | No DG | 1 | 76 | 24 | 18 | 24 | 24 | 28 | 8 | 28 |
| LDC | 5MVA PV (feeder 3) | 2 | 94 | 25 | 14 | 6 | 8 | 12 | 20 | 9 |
| method | 5MVA PV (feeder 1, 3) | 3 | 102 | 27 | 10 | 6 | 10 | 12 | 26 | 11 |
|  | 5MVA Wind (feeder 3) | 4 | 119 | 28 | 16 | 8 | 10 | 12 | 30 | 15 |
|  | 5MVA Wind (feeder 1, 3) | 5 | 98 | 22 | 12 | 6 | 8 | 10 | 24 | 16 |
| Equation 5 | No DG | 6 | 118 | 20 | 28 | 10 | 16 | 16 | 6 | 22 |
| Double | 5MVA PV (feeder 3) | 7 | 119 | 21 | 16 | 12 | 16 | 13 | 11 | 30 |
| dead- | 5MVA PV (feeder 1, 3) | 8 | 119 | 23 | 18 | 6 | 12 | 17 | 11 | 32 |
| band not | 5MVA Wind (feeder 3) | 9 | 122 | 18 | 10 | 12 | 20 | 16 | 14 | 32 |
| applied | 5MVA Wind (feeder 1, 3) | 10 | 132 | 24 | 18 | 8 | 20 | 18 | 10 | 34 |
| Equation 5 | No DG ($DB_0 = 0.005$) | 11 | 50 | 11 | 10 | 8 | 6 | 6 | 3 | 6 |
| Double | 5MVA DG (feeder 3) | 12 | 63 | 16 | 8 | 6 | 10 | 6 | 7 | 10 |
| dead-band | 5MVA DG (feeder 1, 3) | 13 | 65 | 16 | 8 | 4 | 10 | 6 | 7 | 14 |
| applied | 5MVA Wind (feeder 3) | 14 | 46 | 12 | 5 | 9 | 6 | 5 | 3 | 6 |
|  | 5MVA Wind (feeder 1, 3) | 15 | 44 | 10 | 5 | 9 | 6 | 5 | 3 | 6 |

As shown in Table 2, it may be found that the tap switch control method (Double dead band method) according to an embodiment of the present disclosure has much smaller tap operations in comparison to existing methods (LDC and MLDC).

FIG. 7(a) is a graph showing the change of Vs and Vsr values using an existing LDC method, and FIG. 7(b) is a graph showing the change of Vs and Vsr values when the method according to an embodiment of the present disclosure is applied. As shown in FIG. 7(a), the tap operates frequently in existing LDC methods, but it may be found that successive tap operations are suppressed in the method according to an embodiment of the present disclosure, as shown in FIG. 7(b).

The embodiments of the present disclosure may be implemented as program commands executable by various kinds of computer means and recorded on a computer-readable recording medium. The computer-readable recording medium may include program commands, data files, data structures or the like solely or in combination. The program commands recorded on the medium may be specially designed or configured for the present disclosure or known to and available by computer software engineers. The computer-readable recording medium includes, for example, magnetic media such as a hard disk, a floppy disk and a magnetic tape, optical media such as CD-ROM and DVD, magneto-optical media such as a floptical disk, hardware devices such as ROM, RAM and a flash memory, specially configured to store and perform program commands, or the like. The program commands include not only machine codes made by a complier but also high-level language codes executable by a computer by using an interpreter. The hardware device may be configured to operate as at least one software module to perform the operations of the present disclosure, or vice versa.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof.

Therefore, it is intended that this disclosure not be limited to the particular exemplary embodiments disclosed as the best mode contemplated for carrying out this disclosure, but that this disclosure will include all embodiments falling within the scope of the appended claims.

INDUSTRIAL APPLICABILITY

By using the tap switch control method according to an embodiment of the present disclosure, it is possible to suppress a frequent operation of tap switching due to the fluctuations of the system and distributed power supply by applying the double dead band and to ensure the transformer's lifespan.

The invention claimed is:
1. A tap switch control method, comprising:
   measuring data of a distribution system comprising measuring an actual voltage;
   calculating a second dead band and a reference voltage using the measured data;

comparing a difference between the actual voltage and the reference voltage with a first dead band;

comparing the difference between the actual voltage and the reference voltage with the second dead band, when the difference between the actual voltage and the reference voltage is outside the first dead band as a result of the comparison with the first dead band; and controlling the tap of a transformer of the distribution system, when the difference between the actual voltage and the reference voltage is outside the second dead band as a result of the comparison with the second dead band.

2. The tap switch control method according to claim 1, wherein in the measuring of data of a distribution system, at least one of a current of each feeder, a secondary bus voltage, a tap state, and a capacity of a distributed power source is measured.

3. The tap switch control method according to claim 1, wherein in the calculating of the second dead band and the reference voltage, a distributed power source voltage difference of each feeder, which is a difference between a voltage when a distributed power source of each feeder is excluded and a voltage when a total capacity of the distributed power source is applied, is calculated, and a half of a greatest value among the calculated distributed power source voltage difference of each feeder is calculated as the second dead band.

4. The tap switch control method according to claim 1, wherein in the calculating of the second dead band and the reference voltage, a greatest value among voltages calculated using a feeder current and a feeder compensation impedance of each feeder is calculated as the reference voltage.

5. The tap switch control method according to claim 1, further comprising:

determining whether the time during which the difference between the actual voltage and the reference voltage is outside the second dead band is equal to or greater than a reference time, wherein the tap is controlled only when the time during which the difference between the actual voltage and the reference voltage is outside the second dead band is equal to or greater than the reference time.

6. A tap switch, comprising:

a measurement unit configured to measure data of a distribution system including an actual voltage;

a determination unit configured to:
calculate a second dead band and a reference voltage using the measured data;
compare the difference between the actual voltage and the reference voltage with a first dead band; and
compare the difference between the actual voltage and the reference voltage with the second dead band when the difference between the actual voltage and the reference voltage is out of the first dead band; and a tap control unit configured to control the tap of a transformer of the distribution system, when the difference between the actual voltage and the reference voltage is outside the second dead band.

7. The tap switch according to claim 6, wherein the measurement unit measures at least one of a current of each feeder, a secondary bus voltage, a tap state, and a capacity of a distributed power source.

8. The tap switch according to claim 6, wherein the determination unit calculates a distributed power source voltage difference of each feeder which is a difference between a voltage when a distributed power source of each feeder is excluded and a voltage when a total capacity of the distributed power source is applied, and calculates a half of a greatest value among the calculated distributed power source voltage difference of each feeder as the second dead band, and wherein the determination unit calculates a greatest value among voltages calculated using a feeder current and a feeder compensation impedance of each feeder as the reference voltage.

9. The tap switch according to claim 6, wherein the determination unit controls the tap only when the time during which the difference between the actual voltage and the reference voltage is outside the second dead band is equal to or greater than a reference time.

* * * * *